United States Patent [19]

Brammer et al.

[11] 4,075,752
[45] Feb. 28, 1978

[54] METHOD OF MAKING DISTRIBUTOR ASSEMBLY BEARING STRUCTURES AND THE LIKE

[75] Inventors: Hartmut Brammer; Karl Ehrmann; Heinz Haug; Jörg Issler; Günter Käs, all of Stuttgart; Harald Kalippke, Hohenacker; Herbert Mägdefrau; Karl-Heinz Schneider, both of Sonthofen, all of Germany

[73] Assignee: Robert Bosch GmbH, Stuttgart, Germany

[21] Appl. No.: 460,753

[22] Filed: Apr. 15, 1974

Related U.S. Application Data

[63] Continuation of Ser. No. 307,387, Nov. 17, 1972, abandoned.

[30] Foreign Application Priority Data

Nov. 20, 1971 Germany .............................. 2157658

[51] Int. Cl.² ............................................. B23P 15/00
[52] U.S. Cl. ...................................... 29/434; 29/447; 29/DIG. 35; 29/417
[58] Field of Search .................. 29/434, 436, 447, 458, 29/DIG. 35, 417; 308/238; 285/381; 403/273

[56] References Cited

U.S. PATENT DOCUMENTS

| | | | |
|---|---|---|---|
| 2,220,221 | 11/1940 | Dalton | 29/417 |
| 2,539,372 | 1/1951 | Metzler | 29/417 |
| 3,033,624 | 5/1962 | Biesecker | 308/238 |
| 3,045,458 | 7/1962 | Campbell et al. | 64/25 |
| 3,080,183 | 3/1963 | Luertzing et al. | 285/381 |
| 3,313,017 | 4/1967 | Zingali | 29/458 |
| 3,356,426 | 12/1967 | Fadow | 308/238 |
| 3,380,843 | 4/1968 | Davis | 308/238 |
| 3,415,287 | 12/1968 | Heslop et al. | 285/381 |
| 3,560,128 | 2/1971 | Carlton | 29/447 |
| 3,639,960 | 2/1972 | Waage | 29/149.5 NM |

*Primary Examiner*—Lowell A. Larson
*Assistant Examiner*—Daniel C. Crane
*Attorney, Agent, or Firm*—Flynn & Frishauf

[57] ABSTRACT

To prevent corrosion and provide for better relative movement of parts which move only slightly but are exposed to extremes in ambient operating conditions, a tubular piece of plastic material, typically Polyvinylidenfluoride or a polyamide, is drawn over the inner element of a relatively slidable pair, which may, for example be a distributor shaft, the distributor breaker cam, or distributor bearing pins, to cover the surface thereof engaged in slidable contact.

2 Claims, 4 Drawing Figures

METHOD OF MAKING DISTRIBUTOR ASSEMBLY BEARING STRUCTURES AND THE LIKE

FIRST APPLICATION

This is a continuation, of application Ser. No. 307,387, filed Nov. 17, 1972 now abandoned. Priority: Germany, on Nov. 20, 1971, No. P 21 57 658.9.

The present invention relates to a method of making structural units which have relatively movable elements engaged with each other by sliding contacts, and more particularly for making centrifugally adjustable breaker contact of distributors for internal combustion engines, and other structural elements and components which are exposed to extremes in ambient operating conditions.

Structural components and elements made of metal, and particularly of steel which are slideably movable with respect to each other, for example being rotatable with respect to each other, are subject to wear due to friction and corrosion at the respective wearing surfaces. In many applications it is not possible to provide lubrication, for example due to the difficulty in applying lubricant, due to electrical requirements which could be interfered with by the escape of lubricant, or the like. If one element is rotatable with respect to the other, for example by forming a sleeve for a shaft or the like, and the engagement surface is relatively great, and movement occurs only over very small distances and occasionally, rust and powder can form at the relatively-supposedly - movable surfaces causing the surfaces to bind and interfering with free movement. This problem arises particularly in automotive applications and for example in distributors in which components are located to be relatively movable with respect to the distributor shaft, and with respect to the distributor and breaker cam.

It is an object of the present invention to provide structural units which are not subject to interference with slight movement due to rust, corrosion or wear, and in which the difficulties mentioned above are solved in an inexpensive and simple manner.

SUBJECT MATTER OF THE PRESENT INVENTION

Briefly, one of the elements has a cover layer of plastic material applied to the surface which is in relatively slideable contact with the other. In case of distributor shafts, particularly, the shaft is covered with plastic material, by shrinking a plastic tube thereover.

The invention will be described by way of example with reference to the accompanying drawings, wherein.

Figure 1:
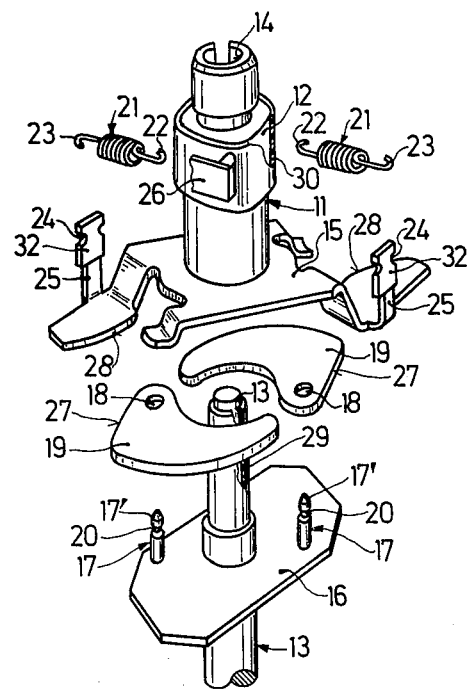
FIG. 1 is an exploded view of a distributor with associated centrifugal timing weights, and illustrating the application of the present invention.
Figure 2:
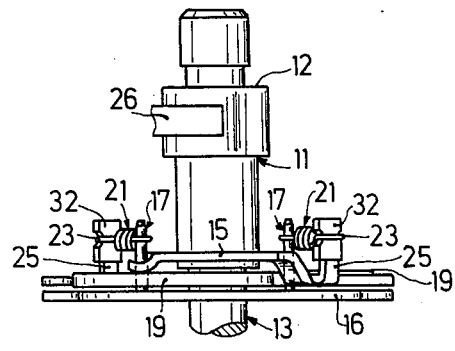
FIG. 2 is a fragmentary side view of the distributor, when assembled together.

An example for elements which are in sliding contact with each other is the centrifugal adjustment for the timing of a distributor. The distributor assembly itself is not shown in detail, nor its connection to an internal combustion engine since such connections and the distributor itself are well known. Reference may be had to "principles of automotive vehicles," U.S. Government publication TM 9-8000, chapter relating to battery ignition and more particularly subchapter relating to ignition systems, in which a typical complete distributor and its assembly are shown. The centrifugal adjuster has a tubular element 11 which has a breaker cam 12 secured thereto, and which is rotatably journalled on a shaft 13. The sleeve 11 has an axial bore 14 surrounding shaft 13. A follower plate 15 is connected to sleeve 11, which is located approximately in the plane transverse to the axis of the shaft 13. The surface of plate 15 which is opposite that to the cam 12 faces a weight carrier plate 16 which is secured to the distributor shaft 13, and which is likewise located in a plane parallel to that of the plate 15. The surface of plate 16 facing the follower plate 16 is formed with a pair of bearing pins 17 which are engaged by openings 18 of centrifugal weight 19, so that the weights 19 can pivot about pins 17 in the plane transverse to the axis of the shaft 13. The two pins 17 have a zone of reduced cross-section 20 at their terminal end 17'. One each of a pair of spiral springs 21 have a terminal end bent into eye shape. The eye-ends of the springs are engaged on one hand on the reduced sections 20 and on the other in a reduced section 24 of the bent-over projection 25 secured to plate 15, the ends 23 of the spring 21 engaging with projections 25. The breaker arm 26, and shown in fragmentary view only in FIGS. 1 and 2 are spring-pressed towards cam 12, to operate breaker contacts, not shown.

GENERAL OPERATION

Breaker carrier plate 16 rotates together with shaft 13. As the speed of rotation increases, the centrifugal weights 19 would pivot outwardly about pins 17, so that the surface 27, on the weights 19, and forming a camming surface engages an engagement camming surface 28 formed on plate 15. This fits the relative position of plate 15, against the tension of the springs 21, with respect to the shaft 13. Thus, sleeve 11 and cam 12 will likewise change their respective position with respect to the shaft 13 while continuing to rotate together with the shaft 13. Movement of the weights 19 outwardly changes the position of the cam 12 in the direction of rotation of the shaft which, as a result, advances the spark since the breaker arm 26 meets a land of the cam at an earlier period of time, with respect to instantaneous shaft position, than when the weights are closed towards shaft 13.

Sleeve 11 and shaft 13 thus rotate over a small angular distance with respect to each other, and slowly, possibly only infrequently depending on operating frequency and conditions of the motor vehicle. To prevent wear at the, contact points, both with respect to the grinding action of vibration as well as with respect to corrosion, a plastic coating or covering layer 29 is placed on the distributor shaft 13. The distributor shaft 13, where covered by sleeve 11, usually is not hardened. The distributor shaft therefore may be relieved in this zone, or formed with grooves (not shown) or notches and the plastic coating 29 can be matched to the grooves and notches. The plastic coating 29 can be ground or lapped to size to provide for proper bearing fit of sleeve 11 over the coated shaft 13.

The breaker cam 12 is likewise formed with a plastic cover coating 30 similarly applied by fitting on a piece of tubular plastic material, so that the engagement of breaker arm 26 with the cam can reduce wear and abrasion to a tolerable degree.

Figure 3:
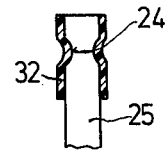
FIG. 3 and FIG. 4 are fragmentary longitudinal cross sectional views through components of the distributor of FIG. 1, to an enlarged scale.
Figure 4:
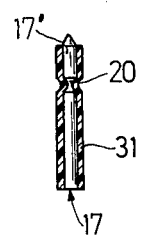

The bearing pins 17, illustrated in FIG. 4, are covered by a plastic coating 31 similarly applied which preferably extends over the full length of the pin 17. Wear and abrasion due to pivoting of the weights 19, as well as abrasion due to the swinging movement of the ends 22 of the springs 21 can thus be sufficiently avoided. The projections 24, one of which is shown in FIG. 3 in cross-section, are likewise covered with a coating 32 in the region of the notch 24 in order to reduce abrasion due to the engagement of the end 23 of spring 21 with the projection 25.

The plastic material 29, 30, 31, 32 is formed as a plastic sleeve which may be a polyvinylidenfluoride or a polyamide. These materials have been found suitable. A plastic sleeve, or small tube of this material can be securely seated on the metal inner part by shrinking a plastic sleeve section on the shaft 13, cam 12, bearing pin 17, or projection 25, respectively. For shrinking, a plastic sleeve is particularly suitable which has a cross linked molecular structure.

The use of tubular plastic material to make the bearing surfaces as above described is highly economical, as the material is readily provided in the form of extruded tubes of high uniformity that are easily cut up precisely and can be shrunk onto metal parts for a close fit without unusual manufacturing difficulty.

We claim:

1. Method of manufacturing a mechanical assembly of the shaft and the shift plate bushing of an ignition distributor of an internal combustion engine, which assembly provides for relative movement of said shaft and shift plate bushing with reduced frictional wear, comprising the steps of:
   cutting into short pieces a length of wear-resistant tubing of substantially uniform wall thickness and made of a resin material having a cross-linked molecular structure;
   putting one of said pieces, in the form in which it is obtained after the aforesaid step of cutting said length of tubing, over a distributor shaft so as to produce a tight-fitting coating over a surface of said shaft in position to bear against a distributor shift plate bushing during relative movement of said shaft and bushing;
   shrinking said piece of tubing in place on said distributor shaft by application of heat thereto, and
   assembling said shaft so coated together with said bushing in such a way as to constrain said bushing to move in frictional contact with said coating of said shaft.

2. Method as defined in claim 1 in which said resin material is a material selected from the group consisting of polyvinylidenefluorides and polyamides.

* * * * *